United States Patent
Yang et al.

(10) Patent No.: US 9,735,962 B1
(45) Date of Patent: Aug. 15, 2017

(54) THREE LAYER KEY WRAPPING FOR SECURING ENCRYPTION KEYS IN A DATA STORAGE SYSTEM

(71) Applicant: EMC Corporation, Hopkinton, MA (US)

(72) Inventors: Lifeng Yang, Beijing (CN); Jian Gao, Beijing (CN); Xinlei Xu, Beijing (CN); Ruiyong Jia, Beijing (CN); Lili Chen, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 41 days.

(21) Appl. No.: 14/870,660

(22) Filed: Sep. 30, 2015

(51) Int. Cl.
*H04L 9/08* (2006.01)

(52) U.S. Cl.
CPC .......... *H04L 9/0897* (2013.01); *H04L 9/0822* (2013.01); *H04L 9/0877* (2013.01)

(58) Field of Classification Search
CPC . H04L 9/00; H04L 9/08; H04L 9/0816; H04L 9/0819; H04L 9/0822; H04L 9/0825; H04L 9/0827; H04L 9/0877; H04L 9/0894; H04L 9/0897; H04L 9/14; G06F 21/00; G06F 21/60; G06F 21/602
See application file for complete search history.

(56) References Cited

U.S. PATENT DOCUMENTS

| | | | | |
|---|---|---|---|---|
| 6,249,866 B1 * | 6/2001 | Brundrett | ............ | G06F 12/1408 380/286 |
| 6,307,936 B1 * | 10/2001 | Ober | ........................ | G06F 8/60 380/277 |
| 6,975,728 B1 * | 12/2005 | Eye | ........................ | H04L 9/0836 380/277 |
| 8,543,838 B1 * | 9/2013 | Au | ........................ | G06F 21/602 713/190 |
| 8,667,267 B1 * | 3/2014 | Garcia | .................. | H04L 63/061 380/202 |
| 9,064,135 B1 * | 6/2015 | Poo | ........................ | G06F 21/72 |
| 9,076,004 B1 * | 7/2015 | Bogorad | ............... | G06F 21/602 |

(Continued)

OTHER PUBLICATIONS

Federal Information Processing Standards Publication 197; "Advanced Encryption Standard (AES)"; Nov. 26, 2001; 51 pages.

(Continued)

*Primary Examiner* — Eric W Shepperd
(74) *Attorney, Agent, or Firm* — BainwoodHuang

(57) ABSTRACT

Securing encryption keys in a data storage system using three layer key wrapping that encrypts a data encryption key using a key encryption key, encrypts the key encryption key using a controller encryption key, and encrypts the controller encryption key using a public key of an asymmetric key pair. The private key is stored on a removable storage device. A separate encryption accelerator component decrypts the encryption keys in order to encrypt and/or decrypt host data from a memory of a storage processor. The removable storage drive must be inserted into a receptacle of the encryption accelerator for encryption and/or decryption to be performed, since the encryption accelerator accesses the private key from the removable storage device in order to decrypt the encrypted controller key. The encryption accelerator generates key handles for the storage processor to use when requesting encryption and/or decryption operations.

14 Claims, 7 Drawing Sheets

(56) References Cited

U.S. PATENT DOCUMENTS

| | | | | |
|---|---|---|---|---|
| 2002/0129246 | A1* | 9/2002 | Blumenau | G06F 21/602 713/168 |
| 2005/0238175 | A1* | 10/2005 | Plotkin | H04L 9/0894 380/281 |
| 2006/0101524 | A1* | 5/2006 | Weber | H04L 63/0428 726/27 |
| 2010/0005318 | A1* | 1/2010 | Hosain | H04L 9/088 713/193 |
| 2010/0254537 | A1* | 10/2010 | Buer | G06F 21/602 380/279 |
| 2011/0026714 | A1* | 2/2011 | Thomas | G06F 21/57 380/278 |
| 2012/0057696 | A1* | 3/2012 | Chew | H04L 9/14 380/30 |
| 2013/0279691 | A1* | 10/2013 | Chen | H04L 9/0822 380/44 |
| 2014/0189853 | A1* | 7/2014 | Epp | G06F 21/10 726/18 |
| 2015/0082048 | A1* | 3/2015 | Ferguson | G06F 21/602 713/189 |
| 2015/0106626 | A1* | 4/2015 | Kremp | H04L 63/06 713/189 |
| 2015/0186657 | A1* | 7/2015 | Nakhjiri | H04L 63/06 713/155 |
| 2017/0093563 | A1* | 3/2017 | Gazit | H04L 9/083 |

OTHER PUBLICATIONS

J. Jonsson, et al.; "Public-Key Cryptography Standards (PKCS) #1: RSA Cryptography Specification Version 2.1"; downloaded from https://tools.ietf.org/rfc/rfc3447 on Oct. 5, 2015; Network Working Group; RSA Laboratories; Feb. 2003; pp. 1-68.

Elaine Barker, et al.; Recommendation for Key Management; Part 3: Application-Specific Key Management Guidance; NIST Special Publication 800-57; National Institute of Standards and Technology; Dec. 2009; pp. 1-103.

\* cited by examiner

THREE LAYER KEY WRAPPING FOR SECURING ENCRYPTION KEYS IN A DATA STORAGE SYSTEM

BACKGROUND

Data storage systems are arrangements of hardware and software that include one or more storage processors coupled to arrays of non-volatile storage devices, such as, for example, magnetic disk drives, electronic flash drives, and/or optical drives. The storage processors service storage requests, typically arriving from host computer systems ("hosts"), which may, for example, specify files or other elements of host data to be written, read, created, or deleted. Software running on the storage processors manages incoming storage requests and performs various data processing tasks to organize and secure the data elements stored on the non-volatile storage devices. In this way, data storage systems provide external data storage to one or more hosts, for storing host data on behalf of the hosts.

It is often desirable for a data storage system to provide a high level of data security with regard to the host data that is stored on the storage system. Providing host data security in a data storage system may include encrypting host data stored on the storage system. Secure management of an encryption key or keys used to encrypt the host data is very important. Key management has previously been described in the National Institute of Standards and Technology (NIST) special Publication 800-57, entitled "Recommendation for Key Management", which provides general guidance and best practices for the management of cryptographic keys. Related key wrapping techniques are symmetric encryption algorithms, and include the Advanced Encryption Standard (AES) specification for securely encrypting a plaintext key.

SUMMARY

Previous approaches to providing secure management of encryption keys in data storage systems have had significant shortcomings. In some previous systems, encryption key management has included encrypting data using a data encryption key (DEK), and then performing a key wrapping operation on the DEK, by way of symmetrical encryption, using a key encryption key (KEK). Unfortunately, using this approach, the possibility exists that the DEK and/or KEK may be stored as unencrypted plaintext in a memory of the data storage system. As a result, if an attacker can exploit a system vulnerability allowing access to data storage system memory, e.g. through the "Heartbleed" security bug, the unencrypted KEK and/or DEK may be exposed, resulting in the possibility of a malicious user gaining unauthorized access to encryption keys that may be used to decrypt previously encrypted host data stored on the data storage system.

To address the above described and other shortcomings of previous systems, a new system is disclosed for securing encryption keys in a data storage system based on three layer key wrapping. In the disclosed system, an encrypted data encryption key (DEK), an encrypted key encryption key (KEK), and an encrypted controller encryption key (CEK) are stored in a memory of an encryption accelerator having a receptacle for a removable data storage device. The encryption accelerator and a storage processor are separate components in the data storage system. The encryption accelerator encrypts host data stored in a memory of the storage processor by i) decrypting the encrypted controller encryption key, using a controller private key stored on a removable data storage device and accessed by the encryption accelerator through the receptacle of the encryption accelerator, to obtain a plaintext controller encryption key, ii) decrypting the encrypted key encryption key, using the plaintext controller encryption key, to obtain a plaintext key encryption key, iii) decrypting the encrypted data encryption key, using the plaintext key encryption key, to obtain a plaintext data encryption key, iv) encrypting the set of host data, using the plaintext data encryption key, to generate a set of encrypted host data, and v) deleting the plaintext controller encryption key, plaintext key encryption key, and plaintext data encryption key, from the encryption accelerator.

In another aspect of the disclosed system, after the encryption accelerator has decrypted the encrypted controller encryption key, its sends a handle identifying the plaintext controller encryption key to the storage processor. Subsequently, the encryption accelerator decrypts the encrypted key encryption key in response to receiving the handle identifying the plaintext controller encryption key from the storage processor. After the encryption accelerator has decrypted the encrypted key encryption key, its sends a handle identifying the plaintext key encryption key to the storage processor, and subsequently decrypts the encrypted data encryption key in response to receiving the handle identifying the plaintext key encryption key from the storage processor. After the encryption accelerator has decrypted the encrypted data encryption key, its sends a handle identifying the plaintext data encryption key to the storage processor, and subsequently encrypts the host data in response to receiving the handle identifying the plaintext data encryption key from the storage processor.

Each plaintext key handle may identify a location in the memory of encryption accelerator at which the corresponding plaintext encryption key is stored. For example, each handle may consist of or include a relative address or address offset understood by and used within the encryption accelerator to locate the corresponding plaintext encryption key in the memory of the encryption accelerator.

In another aspect of the disclosed system, the encryption accelerator may write the encrypted host data to the memory of the storage processor, and program code within the storage processor may cause the encrypted host data to be written to one or more of the storage devices in the data storage system. The encryption accelerator and the storage processor may be communicably coupled by a serial bus, such as, for example, a Peripheral Component Interconnect Express (PCI Express) serial computer expansion bus. The encrypted host data may be conveyed from the memory of the encryption accelerator to the memory of the storage processor over the serial bus, for example using DMA (Direct Memory Access) logic within the encryption accelerator.

In another aspect of the disclosed system, a key management system may be used to generate and distribute keys. The key management system may be located remotely from the data storage system, and keys may be conveyed from the key management system to the data storage system over a secure network connection, for example using IPsec (Internet Protocol Security). The key management system may generate the plaintext controller encryption key, the plaintext key encryption key, and the plaintext data encryption key. The key management system may further generate the encrypted data encryption key by encrypting the plaintext data encryption key using the plaintext key encryption key, and generate the encrypted key encryption key by encrypting the plaintext key encryption key using the plaintext controller encryption key.

The key management system may also generate an asymmetric encryption key pair, made up of the controller private key and a controller public key, where the controller public key is an encryption key, and such that any plaintext encrypted by the controller public key can only be decrypted using the controller private key. The key management system may then generate the encrypted controller encryption key by using the controller public key to encrypt the plaintext controller encryption key. The key management system then stores the controller private key into the removable data storage device through a data storage device receptacle of the key management system. The key management system then transmits the encrypted controller encryption key, encrypted key encryption key, and encrypted data encryption key, through the secure communication channel, to the data storage system.

In another aspect of the disclosed system, decrypting the set of encrypted host data stored in the memory of the storage processor may include i) decrypting, by the encryption accelerator, the encrypted controller encryption key, using the controller private key stored on the removable data storage device and accessed by the encryption accelerator through the data storage device receptacle of the encryption accelerator, to obtain the plaintext controller encryption key, ii) decrypting, by the encryption accelerator, the encrypted key encryption key, using the plaintext controller encryption key, to obtain the plaintext key encryption key, iii) decrypting, by the encryption accelerator, the encrypted data encryption key, using the plaintext key encryption key, to obtain the plaintext data encryption key, iv) decrypting, by the encryption accelerator, the set of encrypted host data, using the plaintext data encryption key, to obtain a set of plaintext host data, and v) deleting the plaintext controller encryption key, plaintext key encryption key, and plaintext data encryption key from the encryption accelerator.

Embodiments of the disclosed system may provide significant advantages over previous technologies. For example, in contrast to previous systems, the disclosed system may be embodied such that plaintext encryption keys are never stored in the memory of the storage processor within the data storage system. Accordingly, any system vulnerabilities of the storage processor cannot be exploited to obtain unauthorized access to unencrypted keys. Additionally, neither encryption nor decryption can be performed without the removable storage device that stores the controller private key being inserted in the receptacle of the encryption accelerator, since the controller private key is accessed by the encryption accelerator from the removable storage device through the receptacle of the encryption accelerator. Once the data is encrypted in the data storage device, removing the removable storage device that stores the controller private key from the receptacle of the encryption accelerator makes it impossible for an unauthorized entity to decrypt the data. The removable data storage device accordingly serves as an security token, similar to a physical key to a safe deposit box. A data owner or system administrator can control access to the encrypted data stored in the data storage system by controlling access to and possession of the removable data storage device that stores the controller private key. A further advantage is that keys transmitted from the key management system to the data storage system are transmitted in encrypted form, and an attacker who intercepts them en route cannot use them to access encrypted host data without also obtaining the controller private key that is delivered separately to the encryption accelerator by way of the removable data storage device.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It is understood that such embodiments are provided by way of example to illustrate various features and principles of the invention, and that the invention hereof is broader than the specific examples of embodiments disclosed below.

An improved technique for securing encryption keys in a data storage system based on three layer key wrapping includes storing an encrypted data encryption key, an encrypted key encryption key, and an encrypted controller encryption key in a memory of an encryption accelerator. The encryption accelerator also includes a receptacle for a removable data storage device, such as a USB (Universal Serial Bus) receptacle. The encryption accelerator is a hardware component within the data storage system, and is a separate component from a storage processor component also contained in the data storage system. Host data stored in a memory of the storage processor is encrypted using the disclosed techniques by first decrypting, by the encryption accelerator, the encrypted controller encryption key, using a controller private key stored on a removable drive data storage device, such as a USB security token, and accessed by the encryption accelerator through the receptacle of the encryption accelerator, to obtain a plaintext controller encryption key. The encryption accelerator then uses the plaintext controller encryption key to decrypt the encrypted key encryption key, in order to obtain a plaintext key encryption key. The encryption accelerator then uses the plaintext key encryption key to decrypt the encrypted data encryption key, in order to obtain a plaintext data encryption key. The encryption accelerator then uses the plaintext data encryption key to encrypt a set of host data, thus generating a set of encrypted host data. After the set of encrypted host data has been generated, the encryption accelerator operates to delete the plaintext controller encryption key, plaintext key encryption key, and plaintext data encryption key, from the encryption accelerator.

Figure 1:
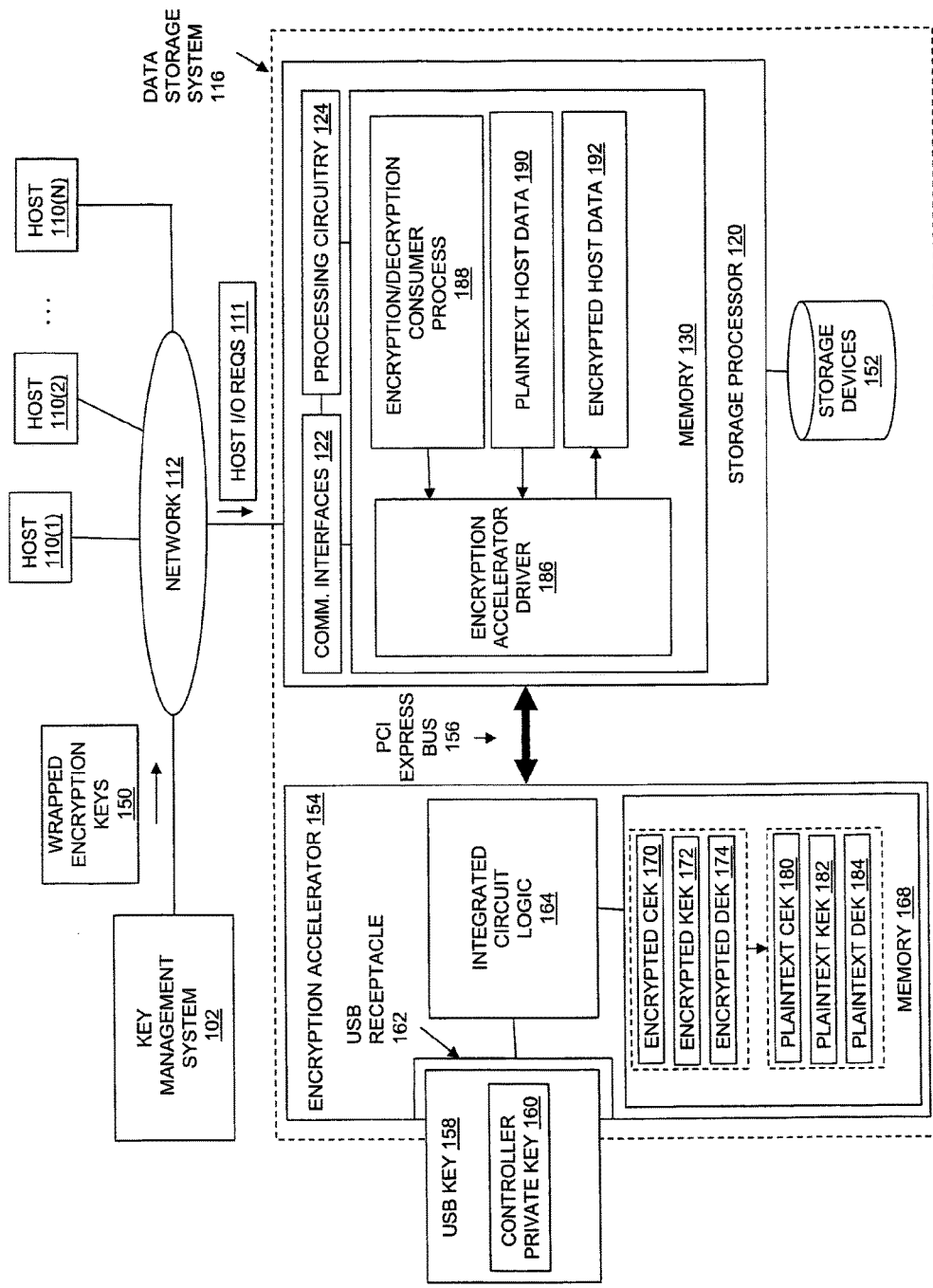
FIG. 1 is a block diagram showing an illustrative embodiment of the disclosed system in an example of an operational environment in which the system may be deployed.

FIG. 1 is a block diagram showing an illustrative embodiment of the disclosed techniques in a system, in an example of an operational environment in which the system may be deployed. Multiple host computing devices ("hosts"), shown as devices 110(1) through 110(N), access a data storage system 116 over a network 112. The data storage system 116 includes a storage processor, or "SP" 120 and storage devices 152. The data storage system 116 may include multiple SPs like the SP 120. In some embodiments, multiple SPs may be provided as circuit board assemblies, or "blades," which plug into a chassis that encloses and cools the SPs. The chassis may have a backplane for interconnecting the SPs, and additional connections may be made among SPs using cables. It is understood, however, that any number of SPs, including a single SP, may be provided and that the SP 120 can be any type of computing device capable of processing host input/output (I/O) requests 111.

The storage devices 152 may, for example, include one or more RAID groups, where each RAID group is composed of multiple disk drives. The disk drives may include magnetic disk drives, electronic flash drives, optical drives, and/or other types of drives. In a typical example, each RAID group may include disk drives of a common type that provide similar performance.

The network 112 can be any type of network or combination of networks, such as a local area network (LAN), a wide area network (WAN), the Internet, and/or some other type of network or combination of networks, for example. The hosts 110(1-N) may connect to the SP 120 using various technologies, such as Fibre Channel, iSCSI (Internet Small Computer Systems Interface), NFS (Network File System), SMB (Server Message Block) 3.0, and CIFS (Common Internet File System), for example. Any number of hosts 110(1-N) may be provided, using any of the above protocols, some subset thereof, or other protocols besides those shown. As is generally known, Fibre Channel and iSCSI are block-based protocols, whereas NFS, SMB 3.0, and CIFS are file-based protocols. The SP 120 may be configured to receive host I/O requests 111 from hosts 110(1-N) according to block-based and/or file-based protocols, and to respond to such I/O requests by reading and/or writing the storage devices 152. Although the data storage system 116 may be capable of receiving and processing both block-based requests and file-based requests, the invention hereof is not limited to data storage systems that can do both.

The SP 120 includes one or more communication interfaces 122, processing circuitry 124, and memory 130. The communication interfaces 122 may include, for example, SCSI target adapters and/or network interface adapters for converting electronic and/or optical signals received over the network 112 to electronic form for use by the SP 120. The processing circuitry 124 includes one or more processing chips (e.g. microprocessors) and/or assemblies. In a particular example, the processing circuitry 124 includes numerous multi-core CPUs. The memory 130 may include both volatile memory (e.g., RAM), and non-volatile memory, such as one or more ROMs, disk drives, solid state drives, and the like. The set of processing circuitry 124 and the memory 130 together form control circuitry, which is constructed and arranged to carry out various methods and functions of the storage processor 120 as described herein. Also, the memory 130 includes a variety of software constructs realized in the form of executable instructions. For example, executable instructions in memory 130 may include an encryption accelerator driver 186 that operates to communicate with and control encryption accelerator 154 on behalf of one or more consumer processes that consume the encryption and decryption capabilities provided by the encryption accelerator 154. Such consumer processes are shown for purposes of illustration in FIG. 1 by encryption/decryption consumer process 188. Encryption/decryption consumer process 188 may, for example, interact with encryption accelerator driver 186 through an application programming interface (API) provided by encryption accelerator driver 186, for the purpose of causing encryption accelerator driver 186 to cause encryption accelerator 154 to encrypt or decrypt specific host data stored in memory 130, as further described below. When executable instructions of encryption accelerator driver 186 or encryption/decryption consumer process 188 are executed by processing circuitry 124, one or more processing units in processing circuitry 124 carry out the operations of these software constructs. Those skilled in the art will recognize that while certain software constructs are specifically shown and described for purposes of explanation, the memory 130 may additionally or alternatively include other software constructs, which are not shown, such as an operating system, various applications, and/or other processes.

Encryption accelerator 154 is a hardware component that is separate from storage processor 120, and that is communicably connected to storage processor 120, for example by way of a PCI Express bus 156. PCI Express bus 156 may, for example, be made up of a PCI Express (Peripheral Component Interconnect Express) high-speed serial computer expansion bus. Alternatively, another specific type of computer peripheral bus, or other communication mechanism, may be used to communicably connect the storage processor 120 with the encryption accelerator 154.

The encryption accelerator 154 includes integrated circuit logic 164, memory 168 and a receptacle for a removable data storage device, e.g. USB receptacle 162. Integrated circuit logic 164 is an application-specific integrated circuit (ASIC) that may, for example, be embodied as a field-programmable gate array (FPGA). Integrated circuit logic 164 may optionally include an embedded microprocessor or the like, as well as direct memory access (DMA) logic for moving data between memory 168 in the encryption accelerator 154 and the memory 130 of the storage processor 120 without occupying processor resources. The memory 168 may include volatile memory (e.g., RAM), and non-volatile memory (ROM). In one embodiment, the memory 168 is a flash memory. The USB receptacle 162 may be embodied using any specific type of connection point or port operable to accept a USB data storage device. In the embodiment of FIG. 1, a USB key 158 is shown inserted into USB receptacle 162. USB key 158 may, for example, be embodied using any specific type of hardware security token technology having an integrated USB interface, that is operable to store and provide access to an encryption key through the USB interface, as further described below. Examples of devices that may be used as USB key 158 include those devices sometimes also referred to as "USB tokens". In other embodiments, other specific types of removable USB data storage device may be used in the alternative.

During operation of the embodiment shown in FIG. 1, encrypted data encryption key (DEK) 174, encrypted key encryption key (KEK) 172, and encrypted controller encryption key (CEK) 170 are stored into the memory 168 of encryption accelerator 154. For example, encrypted DEK 174, encrypted KEK 172, and encrypted CEK 170 may be received as wrapped encryption keys 150 that are received by data storage system 116 from the remote key management system 102. Encryption accelerator driver 186 may pass encrypted DEK 174, encrypted KEK 172, and encrypted CEK 170 to encryption accelerator 154, and integrated circuit logic 164 may store encrypted DEK 174, encrypted key encryption key KEK 172, and encrypted CEK 170 into memory 168.

Encryption of plaintext host data 190 to obtain encrypted host data 192 is performed by encryption accelerator 154, for example in response to a request from encryption accelerator driver 186 to encrypt plaintext host data 190. Integrated circuit logic 164 in encryption accelerator 154 may encrypt plaintext host data 190 by first decrypting the encrypted CEK 170, using the controller private key 160 stored on USB key 158, to obtain plaintext CEK 180. Integrated circuit logic 164 accesses controller private key 160 on USB key 158 through the USB receptacle 162 of the encryption accelerator 154. Integrated circuit logic 164 then decrypts the encrypted KEK 172, using the plaintext CEK 180, to obtain plaintext KEK 182. Integrated circuit logic 164 then decrypts encrypted DEK 184, using the plaintext KEK 182, to obtain plaintext DEK 184. Integrated circuit logic 164 then encrypts the plaintext host data 190, using plaintext DEK 184, to generate encrypted host data 192, and deletes plaintext CEK 180, plaintext KEK 182, and plaintext DEK 184, from memory 168 in the encryption accelerator 154.

Integrated circuit logic 164 may read plaintext host data 190 into memory 168, perform the encryption using plaintext DEK 184 in memory 168, and then write the encrypted host data 192 to the memory 130 of the storage processor 120. Encryption/decryption consumer process 188 may then write encrypted host data 192 to one or more of the storage devices 152, and delete plaintext host data 190. In such an embodiment, the encrypted host data 192 may be conveyed from the memory 168 of the encryption accelerator 154 to the memory 130 of the storage processor 120 over the PCI Express bus 156, for example using DMA (Direct Memory Access) logic within the integrated circuit logic 164 of encryption accelerator 154.

Further during operation of the disclosed system, decryption of encrypted host data 192 to obtain plaintext host data 190 may also be performed by encryption accelerator 154, for example in response to a request from encryption accelerator driver 186 to decrypt encrypted host data 192. Integrated circuit logic 164 in encryption accelerator 154 may decrypt encrypted host data 192 by first decrypting the encrypted CEK 170, again using the controller private key 160 stored on USB key 158, to obtain plaintext CEK 180. Integrated circuit logic 164 again accesses controller private key 160 on USB key 158 through the USB receptacle 162 of the encryption accelerator 154. Integrated circuit logic 164 then uses the plaintext CEK 180 to decrypt the encrypted KEK 172 to obtain plaintext KEK 182, and decrypts encrypted DEK 174 using the plaintext KEK 182 to obtain plaintext DEK 184. Integrated circuit logic 164 then decrypts the encrypted host data 192, using plaintext DEK 184, to generate plaintext host data 190, and deletes plaintext CEK 180, plaintext KEK 182, and plaintext DEK 184, from memory 168 in the encryption accelerator 154.

Figure 2:
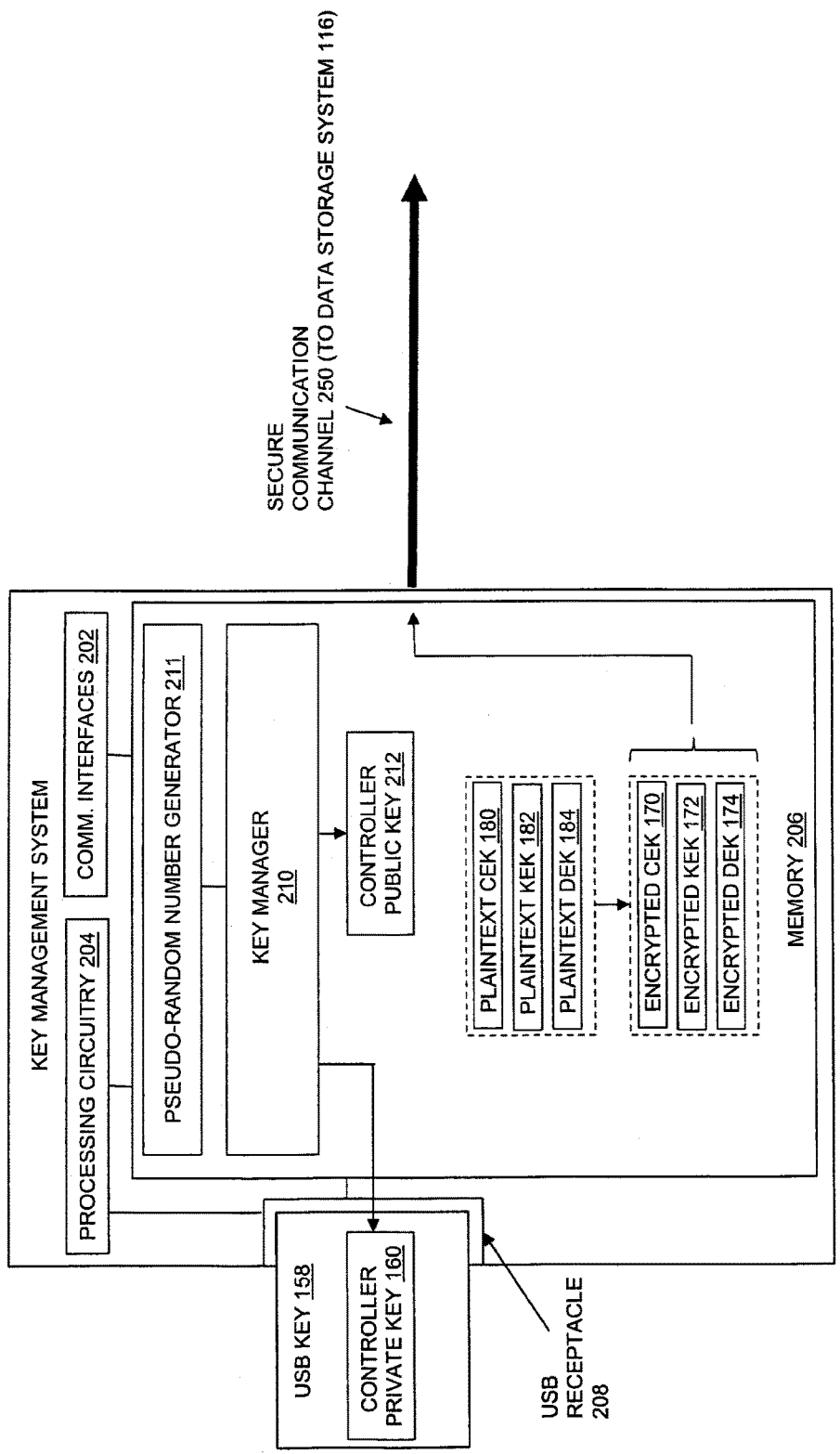
FIG. 2 is a block diagram showing an example of a key management system in an illustrative embodiment of the disclosed system.

FIG. 2 is a block diagram showing an example embodiment of key management system 102, that generates and distributes keys in an illustrative embodiment of the disclosed system. As shown in FIG. 2, key management system 102 may include processing circuitry 204, communication interfaces 202, memory 206, and a receptacle for a removable data storage device, e.g. USB receptacle 208. The communication interfaces 202 may include, for example, network interface adapters for converting electronic and/or optical signals received over the network 112 to electronic form for use by the key management system 102. The processing circuitry 204 may include one or more processing chips (e.g. microprocessors) and/or assemblies. In one embodiment, the processing circuitry 204 includes numerous multi-core CPUs. The memory 206 may include both volatile memory (e.g., RAM), and non-volatile memory, such as one or more ROMs, disk drives, solid state drives, and the like. The set of processing circuitry 204 and the memory 206 together form control circuitry, which is constructed and arranged to carry out various methods and functions of the key management system 102 described herein. Also, the memory 206 includes a variety of software constructs realized in the form of executable instructions. For example, executable instructions in memory 206 may include a key manager 210 that operates to generate, wrap and distribute encryption and/or decryption keys for use by data storage system 116, and a pseudo-random number generator 211 used by key manager 210. When executable instructions of key manager 210 and/or pseudo-random number generator 211 are executed by processing circuitry 204, one or more processing units in processing circuitry 204 carry out the operations of these software constructs. Those skilled in the art will recognize that while certain software constructs are specifically shown and described for purposes of explanation, the memory 206 may additionally or alternatively include other software constructs, which are not shown, such as an operating system, various applications, and/or other processes.

The USB receptacle 208 may be embodied using any specific type of connection point or port operable to accept a USB data storage device. In FIG. 2, USB key 158 is shown inserted into USB receptacle 208.

Key management system 102 may be located remotely from the data storage system 116 (FIG. 1), and keys may be conveyed from the key management system 102 to the data storage system 116 over a secure network connection or channel, for example using IPsec (Internet Protocol Security).

During operation of the key management system 102 shown in FIG. 2, key manager 210 executing in key management system 102 may generate the plaintext CEK 180, the plaintext KEK 182, and the plaintext DEK 184. Plaintext CEK 180, the plaintext KEK 182, and the plaintext DEK 184 are symmetric cryptographic keys, and each are used for both encryption and decryption. Any specific type of symmetric cryptography may be used. For example, plaintext CEK 180, the plaintext KEK 182, and the plaintext DEK 184 may each be used as symmetric keys to perform both encryption and decryption consistent with the Advanced Encryption Standard (AES), as specified by the National Institute of Standards and Technology (NIST). Each of plaintext CEK 180, the plaintext KEK 182, and the plaintext DEK 184 may be integers generated in whole or in part using the pseudo-random number generator 211. Alternatively, one or more of plaintext CEK 180, the plaintext KEK 182, and the plaintext DEK 184 may include or be based in part on an identifier of the data storage system 116, and/or be deterministically generated using a key-derivation function (KDF).

The key manager 210 may further generate the encrypted DEK 174 by encrypting the plaintext DEK 184 using the plaintext KEK 182, and generate the encrypted KEK 172 by encrypting the plaintext KEK 182 using the plaintext CEK 180.

Further during operation of key management system 102, key manager 210 also generates an asymmetric encryption key pair, made up of the controller private key 160 and a controller public key 212. Key manager 210 generates the asymmetric key pair including controller private key 160 and a controller public key 212 such that any plaintext encrypted by the controller public key 212 can only be decrypted using the controller private key 160. For example, key manager 210 may generate the asymmetric encryption key pair that includes controller private key 160 and controller public key 212 consistent with the RSA cryptosystem (RSA), as for example set forth in the public-key cryptography standards devised and published by RSA Security, Inc., and described in Request for Comments (RFC) 3447, entitled "Public-Key Cryptography Standards (PKCS) #1: RSA Cryptography Specifications Version 2.1".

Key manager 210 generates encrypted CEK 170 by using the controller public key 212 to encrypt the plaintext CEK 180. Key manager 210 stores the controller private key 160 into the removable data storage device, e.g. USB key 158, through the data storage device receptacle, e.g. USB receptacle 208, of the key management system 102. The key management system then transmits the encrypted CEK 170, encrypted KEK 172, and encrypted DEK 174 to the data storage system 116, through the secure communication channel 250 (see e.g. wrapped encryption keys 150 in FIG. 1). For any encryption and/or decryption to be performed, the controller private key 160 must be separately physically transported within the USB key 158 to the data storage system 116, and inserted into the USB receptacle 162 of the encryption accelerator 154 (FIG. 1).

Figure 3:
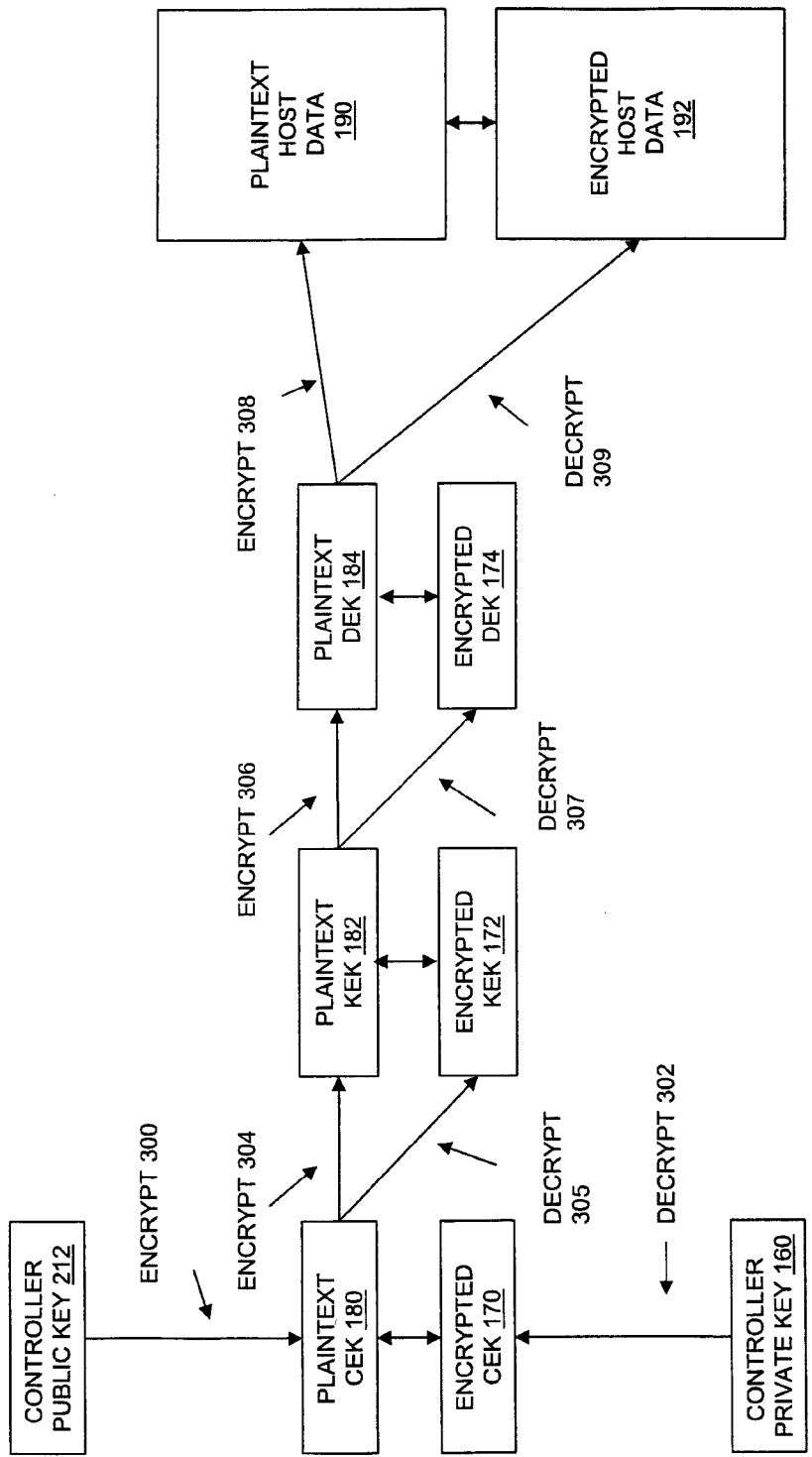
FIG. 3 is a block diagram illustrating the relationship between encryption keys in an illustrative environment of the disclosed system.

FIG. 3 is a block diagram further illustrating the relationship between encryption keys in an illustrative environment of the disclosed system. As shown in FIG. 3, the disclosed system uses asymmetric encryption (e.g. RSA) with regard to the plaintext CEK 180 and encrypted CEK 170, i.e. the controller public key 212 is used to encrypt 300 the plaintext CEK 180 and the controller private key 160 is used to decrypt 302 the encrypted CEK 170. In contrast, symmetric encryption (e.g. AES) is used to both encrypt 304 the plaintext KEK 182, and to decrypt 305 the encrypted KEK 172 using the plaintext CEK 180 in each case. Similarly, symmetric encryption (e.g. AES) is used to both encrypt 306 the plaintext DEK 184, and to decrypt 307 the encrypted DEK 174, using the plaintext KEK 182 in each case. Also, symmetric encryption (e.g. AES) is used to both encrypt 308 the plaintext host data 190, and to decrypt 309 the encrypted host data 192, using the plaintext DEK 184 in each case.

Figure 4:
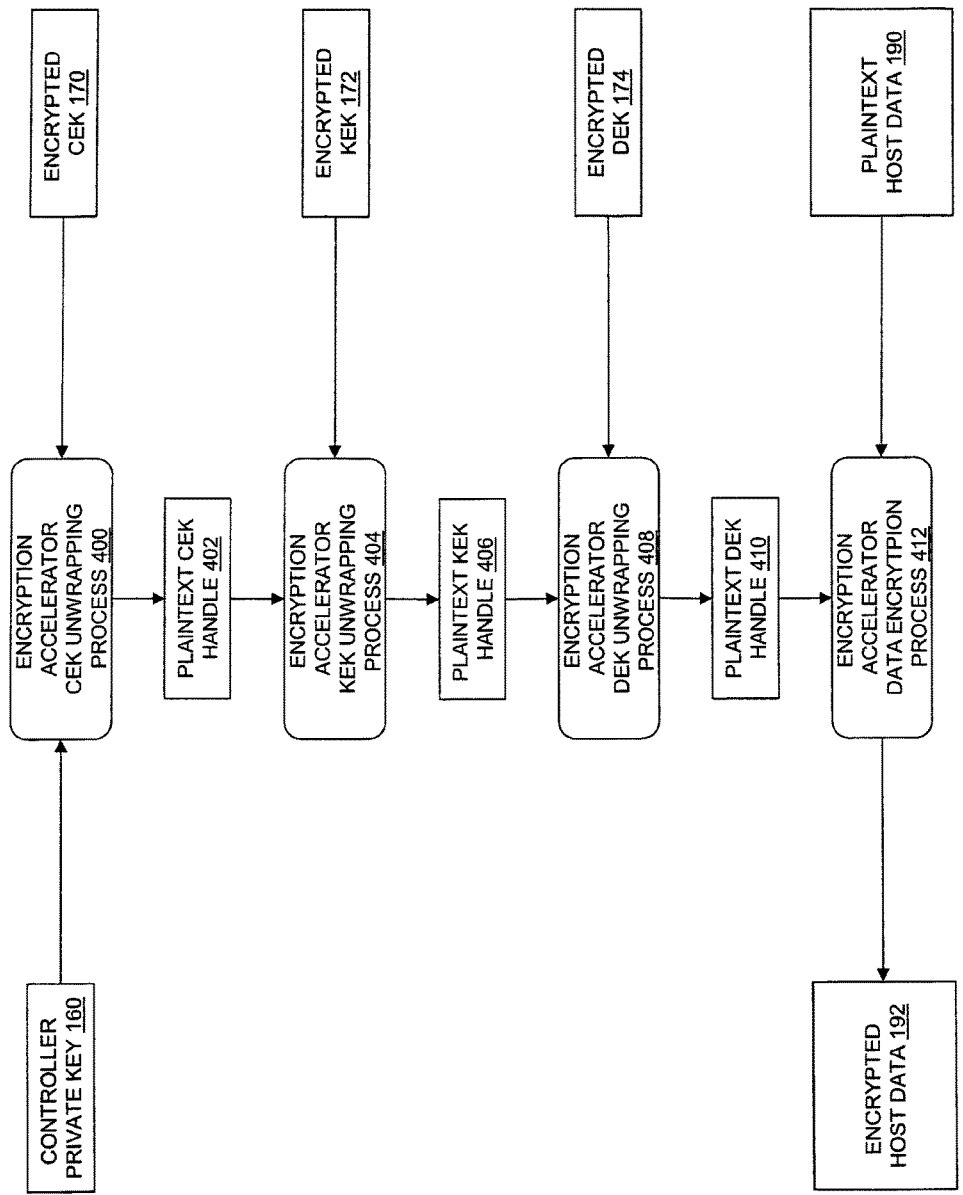
FIG. 4 is a flow chart illustrating a process of encrypting host data during operation of an illustrative embodiment of the disclosed system.

FIG. 4 is a flow chart illustrating a process of encrypting host data during operation of an illustrative embodiment of the disclosed system. The unwrapping processes 400, 404, and 408, and the encryption process 412 shown in FIG. 4 may, for example, be embodied in the integrated circuit logic 164 shown in FIG. 1. The handles 402, 406, and 410 are offsets or addresses understood and capable of being used only by the integrated circuit logic 164 to locate the associated plaintext keys in memory 168 of the encryption accelerator 154.

As shown in FIG. 4, an encryption accelerator CEK unwrapping process 400 receives as inputs the controller private key 160 and encrypted CEK 170, decrypts the encrypted CEK 170 using the controller private key 160, and outputs a handle 402 associated with the plaintext CEK 180. For example, the handle 402 may be an offset or relative address that can be used only by integrated circuit logic 164 to determine the physical location of the plaintext CEK 180 in memory 168.

An encryption accelerator KEK unwrapping process 404 receives as inputs the handle 402 for plaintext CEK 180 and encrypted KEK 172, uses handle 402 to locate plaintext CEK 180 in memory 168, and decrypts the encrypted KEK 172 using the plaintext CEK 180. Encryption accelerator KEK unwrapping process 404 outputs a handle 406 associated with the plaintext KEK 182. For example, the handle 406 may be an offset or relative address that can only be used by integrated circuit logic 164 to determine the physical location of the plaintext KEK 182 in memory 168.

An encryption accelerator DEK unwrapping process 408 receives as inputs the handle 406 for plaintext KEK 182 and encrypted DEK 174, uses handle 406 to locate plaintext KEK 182 in memory 168, and decrypts the encrypted DEK 174 using the plaintext KEK 182. Encryption accelerator DEK unwrapping process 408 outputs a handle 410 associated with the plaintext DEK 184. For example, the handle 410 may be an offset or relative address that can only be used by integrated circuit logic 164 to determine the physical location of the plaintext DEK 184 in memory 168.

An encryption accelerator data encryption process 412 receives as inputs the handle 410 for plaintext DEK 184 and plaintext host data 190, uses handle 410 to locate plaintext DEK 184 in memory 168, and encrypts plaintext host data 190 using the plaintext DEK 184. Encryption accelerator data encryption process 412 outputs encrypted host data 192, which may then be written from the memory 168 in the encryption accelerator 154 to the memory 130 of the storage processor 120.

Figure 5:
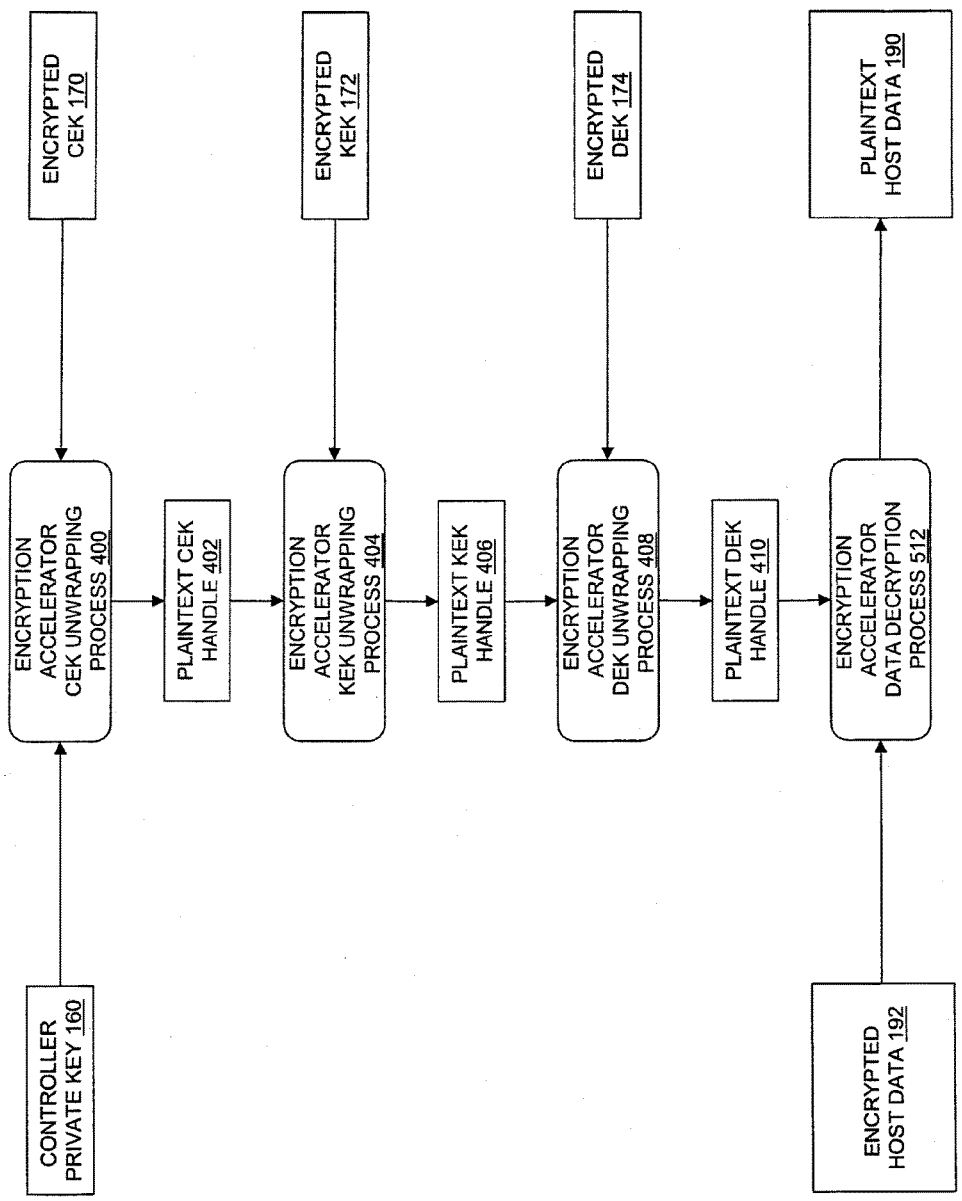
FIG. 5 is a flow chart illustrating a process of decrypting previously encrypted host data during operation of an illustrative embodiment of the disclosed system.

FIG. 5 is a flow chart illustrating a process of decrypting previously encrypted host data during operation of an illustrative embodiment of the disclosed system. The processes 400, 404, 406, and 408 in FIG. 5 correspond to the same processes shown in FIG. 4 and described above. However, during operation of the disclosed system to decrypt previously encrypted host data, the encryption accelerator DEK unwrapping process 408 outputs the handle 410 associated with the plaintext DEK 184 to an encryption accelerator data decryption process 512, which also takes as an input encrypted host data 192. Encryption accelerator data decryption process 512 uses handle 410 to locate plaintext DEK 184 in memory 168, and decrypts encrypted host data 192 using the plaintext DEK 184. Encryption accelerator data decryption process 512 outputs plaintext host data 190, which may then be written from the memory 168 in the encryption accelerator 154 to the memory 130 of the storage processor 120.

Figure 6:
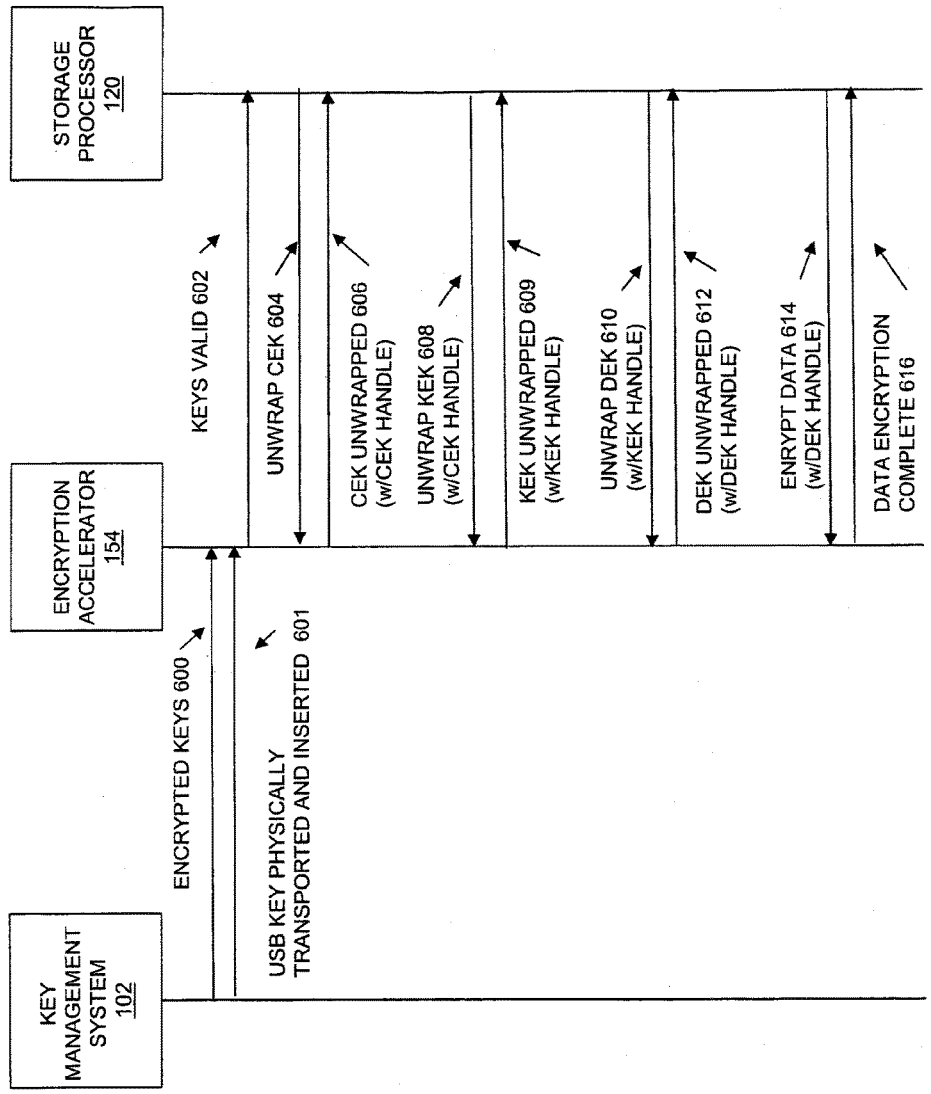
FIG. 6 is an interaction diagram illustrating the interactions between the key management system, encryption accelerator and storage processor in an illustrative embodiment.

FIG. 6 is an interaction diagram illustrating the interactions between the key management system, encryption accelerator and storage processor in an illustrative embodiment. As shown in FIG. 6, at 600 encrypted keys are conveyed from key management system 102, into the memory 168 of encryption accelerator 154. For example, wrapped encryption keys 150 (FIG. 1), including encrypted CEK 170, encrypted KEK 172, and encrypted DEK 174, are transmitted over a secure connection through network 112 to the data storage system 116. The encryption accelerator driver 186 then passes the encrypted CEK 170, encrypted KEK, and encrypted DEK 174 to the encryption accelerator 154, for storage by the integrated circuit logic 164 into memory 168.

At 601 the USB key 158 storing the controller private key 160 is physically removed from the key management system 102, and carried or otherwise transported to the data storage system 116. The USB key 158 is then inserted into the USB receptacle 162 in encryption accelerator 154. After the encrypted CEK 170, encrypted KEK, and encrypted DEK 174 have been stored into the memory 168, and the USB key 158 storing the controller private key 160 has been inserted into the USB receptacle 162, at 602 the encryption accelerator 154 passes a keys valid message to the storage processor 120, indicating that the necessary keys are in place for performing host data encryption and/or decryption.

At 604, the storage processor 120 passes an unwrap CEK message to the encryption accelerator 154, requesting that the encryption accelerator decrypt the encrypted CEK 170. In response, the encryption accelerator 154 then decrypts the encrypted CEK 170 to obtain the plaintext CEK 180, and at 606 passes a message back to the storage processor 120 indicating that the encrypted CEK 170 has been unwrapped (decrypted), together with a handle associated with the plaintext CEK 180.

At 608, the storage processor 120 passes an unwrap KEK message to the encryption accelerator 154, requesting that the encryption accelerator decrypt the encrypted KEK 172, and including the handle associated with plaintext CEK 180. In response, the encryption accelerator 154 uses the handle associated with plaintext CEK 180 to locate plaintext CEK 180 in memory 168, and then decrypts the encrypted KEK 172 using plaintext CEK 180 to obtain the plaintext KEK 182. At 609 encryption accelerator 154 passes a message back to the storage processor 120 indicating that the encrypted KEK 172 has been unwrapped (decrypted), together with a handle associated with the plaintext KEK 182.

At 610, the storage processor 120 passes an unwrap DEK message to the encryption accelerator 154, requesting that the encryption accelerator decrypt the encrypted DEK 174, and including the handle associated with plaintext KEK 182. In response, the encryption accelerator 154 uses the handle associated with plaintext KEK 182 to locate plaintext KEK 182 in memory 168, and then uses plaintext KEK 182 to decrypt the encrypted DEK 174 to obtain the plaintext DEK 184. At 612 the encryption accelerator 154 passes a message back to the storage processor 120 indicating that the encrypted DEK 174 has been unwrapped (decrypted), together with a handle associated with the plaintext DEK 184.

At 614, the storage processor 120 passes an message to the encryption accelerator 154, requesting that the encryption accelerator perform encryption with regard to host data, and including the handle associated with plaintext DEK 184. In response, the encryption accelerator 154 uses the handle associated with plaintext DEK 184 to locate plaintext DEK 184 in memory 168, and then encrypts the host data using plaintext DEK 184. At 616 encryption accelerator 154 passes a message back to storage processor 120 indicating that the encryption of the host data has been completed. Alternatively, at 614 the storage processor 120 may pass an message to the encryption accelerator 154 requesting that the encryption accelerator perform decryption with regard to previously encrypted host data, and similarly including the handle associated with plaintext DEK 184. In response, the encryption accelerator 154 uses the handle associated with plaintext DEK 184 to locate plaintext DEK 184 in memory 168, and then decrypts the encrypted host data using plaintext DEK 184. At 616 encryption accelerator 154 would then pass a message back to storage processor 120 indicating that the decryption of the host data has been completed.

As shown in FIG. 6 and described above, the storage processor 120 is only provided with the handles associated with the plaintext CEK, KEK and DEK. The plaintext CEK, KEK and DEK are never passed from the encryption accelerator 154 to the storage processor 120. Moreover, the handles associated with plaintext CEK, KEK and DEK may be offsets or relative addresses that can only be used by the encryption accelerator 154, e.g. that must each be combined with a base address known only to the integrated circuit logic 164 in order to locate the respective one of the associated plaintext keys in memory 168. Accordingly, through operation of the disclosed system, the plaintext CEK, KEK and DEK are only accessible within the encryption accelerator 154, and are not exposed through the memory 130 of storage processor 120 to any malicious attacks that could potentially result in unauthorized access to memory 130.

Figure 7:
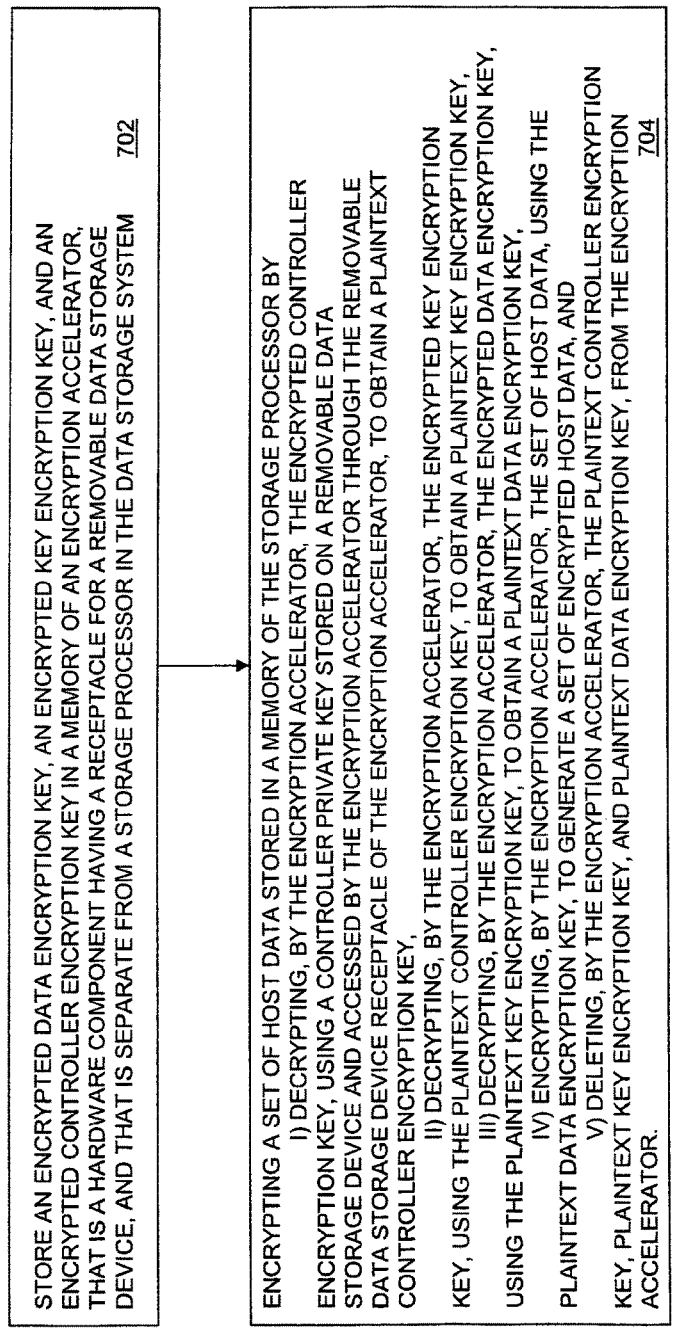
FIG. 7 is a flow chart showing an example of a process for securing encryption keys in a data storage system based on the disclosed three layer key wrapping techniques.

FIG. 7 is a flow chart showing an example of a process for securing encryption keys in a data storage system based on the disclosed three layer key wrapping techniques. At step 702, an encrypted data encryption key, an encrypted key encryption key, and an encrypted controller encryption key are stored in a memory of an encryption accelerator. The encryption accelerator is a hardware component having a receptacle for a removable data storage device, and is separate from a storage processor also contained in the data storage system.

At step 704, a set of host data stored in a memory of the storage processor is encrypted by i) decrypting, by the encryption accelerator, the encrypted controller encryption key, using a controller private key stored on a removable data storage device and accessed by the encryption accelerator through the removable data storage device receptacle of the encryption accelerator, to obtain a plaintext controller encryption key, ii) decrypting, by the encryption accelerator, the encrypted key encryption key, using the plaintext controller encryption key, to obtain a plaintext key encryption key, iii) decrypting, by the encryption accelerator, the encrypted data encryption key, using the plaintext key encryption key, to obtain a plaintext data encryption key, iv) encrypting, by the encryption accelerator, the set of host data, using the plaintext data encryption key, to generate a set of encrypted host data, and v) deleting, by the encryption accelerator, the plaintext controller encryption key, plaintext key encryption key, and plaintext data encryption key, from the encryption accelerator.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of securing encryption keys in a data storage system, comprising:
    storing an encrypted data encryption key, an encrypted key encryption key, and an encrypted controller encryption key in a memory of an encryption accelerator, wherein the encryption accelerator is a hardware component having a receptacle for a removable data storage device and is separate from a storage processor in the data storage system; and
    encrypting a set of host data stored in a memory of the storage processor by:
        i) decrypting, by the encryption accelerator, the encrypted controller encryption key, using a controller private key stored on the removable data storage device and accessed by the encryption accelerator through the receptacle of the encryption accelerator, to obtain a plaintext controller encryption key,
        ii) decrypting, by the encryption accelerator, the encrypted key encryption key, using the plaintext controller encryption key, to obtain a plaintext key encryption key,
        iii) decrypting, by the encryption accelerator, the encrypted data encryption key, using the plaintext key encryption key, to obtain a plaintext data encryption key,
        iv) encrypting, by the encryption accelerator, the set of host data, using the plaintext data encryption key, to generate a set of encrypted host data, and
        v) deleting, by the encryption accelerator, the plaintext controller encryption key, plaintext key encryption key, and plaintext data encryption key, from the encryption accelerator.

2. The method of claim 1, wherein decrypting the encrypted controller encryption key by the encryption accelerator includes sending a controller encryption key handle identifying the plaintext controller encryption key from the encryption accelerator to the storage processor;
    wherein decrypting the encrypted key encryption key is in response to receipt of the controller encryption key handle by the encryption accelerator from the storage processor, and includes sending a key encryption key handle identifying the plaintext key encryption key from the encryption accelerator to the storage processor;
    wherein decrypting the encrypted data encryption key is in response to receipt of the key encryption key handle by the encryption accelerator from the storage processor, and includes sending a data encryption key handle identifying the plaintext data encryption key from the encryption accelerator to the storage processor; and
    wherein encrypting the set of host data is in response to receipt of the data encryption key handle by the encryption accelerator from the storage processor.

3. The method of claim 2, wherein the controller encryption key handle identifying the plaintext controller encryption key indicates a location at which the plaintext controller encryption key is stored within a memory of the encryption accelerator;
    wherein the key encryption key handle identifying the plaintext key encryption key indicates a location at which the plaintext data encryption key is stored within the memory of the encryption accelerator; and
    wherein the data encryption key handle identifying the plaintext data encryption key indicates a location at which the plaintext data encryption key is stored within the memory of the encryption accelerator.

4. The method of claim 3, wherein encrypting the set of host data stored in the memory of the storage processor further comprises writing the set of encrypted host data from the memory of the encryption accelerator to the memory of the storage processor, and further comprising:
    writing the set of encrypted host data from the memory of the storage processor to at least one storage device within the data storage system.

5. The method of claim 4, wherein the encryption accelerator and the storage processor are communicably coupled by a serial bus over which communications between the encryption accelerator and the storage processor are conveyed; and wherein writing the set of encrypted host data from the memory of the encryption accelerator to the memory of the storage processor comprises sending the set of encrypted host data over the serial bus from the encryption accelerator to the storage processor.

6. The method of claim 5, further comprising:

generating, in a key management system that is separate from the data storage system and communicable with the data storage system over a computer network, the plaintext controller encryption key, the plaintext key encryption key, and the plaintext data encryption key;

encrypting, in the key management system, using the plaintext key encryption key, the plaintext data encryption key to generate the encrypted data encryption key;

encrypting, in the key management system using the plaintext controller encryption key, the plaintext key encryption key to generate the encrypted key encryption key;

generating, in the key management system, a key pair comprising the controller private key and a controller public key, wherein the controller public key is an encryption key, and wherein any plaintext encrypted by the controller public key can only be decrypted using the controller private key;

encrypting, in the key management system using the controller public key, the plaintext controller encryption key to generate the encrypted controller encryption key;

storing the controller private key into the removable data storage device through a removable data storage device receptacle of the key management system; and transmitting, from the key management system over the computer network, through a secure communication channel to the data storage system, the encrypted controller encryption key, encrypted key encryption key, and encrypted data encryption key.

7. The method of claim 6, further comprising:

decrypting the set of encrypted host data stored in the memory of the storage processor by:
 i) decrypting, by the encryption accelerator, the encrypted controller encryption key, using the controller private key stored on the removable data storage device and accessed by the encryption accelerator through the receptacle of the encryption accelerator, to obtain the plaintext controller encryption key,
 ii) decrypting, by the encryption accelerator, the encrypted key encryption key, using the plaintext controller encryption key, to obtain the plaintext key encryption key,
 iii) decrypting, by the encryption accelerator, the encrypted data encryption key, using the plaintext key encryption key, to obtain the plaintext data encryption key,
 iv) decrypting, by the encryption accelerator, the set of encrypted host data, using the plaintext data encryption key, to obtain a set of plaintext host data, and
 v) deleting the plaintext controller encryption key, plaintext key encryption key, and plaintext data encryption key from the encryption accelerator.

8. A system for securing encryption keys in a data storage system, comprising:

a storage processor, within the data storage system, wherein the storage processor includes processing circuitry and a memory coupled to the processing circuitry;

a hardware encryption accelerator, within the data storage system, wherein the hardware encryption accelerator is separate from and communicably coupled to the storage processor, wherein the hardware encryption accelerator includes integrated circuit logic, a receptacle for a removable data storage device, and a memory coupled to the integrated circuit logic, wherein the memory in the hardware encryption accelerator stores an encrypted data encryption key, an encrypted key encryption key, and an encrypted controller encryption key, and wherein the integrated circuit logic in the encryption accelerator is configured and arranged to encrypt a set of host data stored in the memory of the storage processor by:
 i) decrypting the encrypted controller encryption key, using a controller private key stored on the removable data storage device and accessed by the encryption accelerator through the receptacle of the encryption accelerator, to obtain a plaintext controller encryption key,
 ii) decrypting the encrypted key encryption key, using the plaintext controller encryption key, to obtain a plaintext key encryption key,
 iii) decrypting the encrypted data encryption key, using the plaintext key encryption key, to obtain a plaintext data encryption key,
 iv) encrypting the set of host data, using the plaintext data encryption key, to generate a set of encrypted host data, and
 v) deleting the plaintext controller encryption key, plaintext key encryption key, and plaintext data encryption key, from the encryption accelerator.

9. The system of claim 8, wherein the integrated circuit logic in the encryption accelerator is further configured and arranged to send, to the storage processor upon completion of decrypting the encrypted controller encryption key, a controller encryption key handle identifying the plaintext controller encryption key;

wherein decrypting the encrypted key encryption key by the integrated circuit logic in the encryption accelerator is in response to receipt of the controller encryption key handle by the encryption accelerator from the storage processor, and includes sending a key encryption key handle identifying the plaintext key encryption key from the encryption accelerator to the storage processor;

wherein decrypting the encrypted data encryption key by the integrated circuit logic in the encryption accelerator is in response to receipt of the key encryption key handle by the encryption accelerator from the storage processor, and includes sending a data encryption key handle identifying the plaintext data encryption key from the encryption accelerator to the storage processor; and wherein encrypting the set of host data by the integrated circuit logic in the encryption accelerator is in response to receipt of the data encryption key handle by the encryption accelerator from the storage processor.

10. The system of claim 9, wherein the controller encryption key handle identifying the plaintext controller encryption key indicates a location at which the plaintext controller encryption key is stored within a memory of the encryption accelerator;

wherein the key encryption key handle identifying the plaintext key encryption key indicates a location at which the plaintext key encryption key is stored within the memory of the encryption accelerator; and wherein the data encryption key handle identifying the plaintext data encryption key indicates a location at which the plaintext data encryption key is stored within the memory of the encryption accelerator.

11. The system of claim 10, wherein the integrated circuit logic in the encryption accelerator is further configured and arranged to write the set of encrypted host data from the memory of the encryption accelerator to the memory of the storage processor upon completing the encryption of the set of host data stored in the memory of the storage processor; and wherein the memory of the storage processor stores program code which, when executed by the processing circuitry of the storage processor, causes the processing circuitry to write the set of encrypted host data from the memory of the storage processor to at least one storage device within the data storage system.

12. The system of claim 11, wherein the encryption accelerator and the storage processor are communicably coupled by a serial bus over which communications between the hardware encryption accelerator module and the storage processor are conveyed; and wherein the integrated circuit logic in the encryption accelerator writes the set of encrypted host data from the memory of the encryption accelerator to the memory of the storage processor by sending the set of encrypted host data over the serial bus from the encryption accelerator to the storage processor.

13. The system of claim 12, further comprising:

a key management system, separate from the data storage system and communicable with the data storage system over a computer network, including processing circuitry, a receptacle for the removable data storage device, and a memory coupled to the processing circuitry, the memory storing program code which, when executed by the processing circuitry, cause the processing circuitry to:

generate the plaintext controller encryption key, the plaintext key encryption key, and the plaintext data encryption key, encrypt, using the plaintext key encryption key, the plaintext data encryption key to generate the encrypted data encryption key, encrypt, using the plaintext controller encryption key, the plaintext key encryption key to generate the encrypted key encryption key, generate a key pair comprising the controller private key and a controller public key, wherein the controller public key is an encryption key, and wherein any plaintext encrypted by the controller public key can only be decrypted using the controller private key, encrypt, using the controller public key, the plaintext controller encryption key to generate the encrypted controller encryption key, store the controller private key into the removable data storage device through the receptacle of the key management system, and transmit, from the key management system over the computer network, through a secure communication channel to the data storage system, the encrypted controller encryption key, encrypted key encryption key, and encrypted data encryption key.

14. The system of claim 13, further comprising:

wherein the integrated circuit logic in the encryption accelerator is configured and arranged to decrypt the set of encrypted host data stored in the memory of the storage processor by:

i) decrypting the encrypted controller encryption key, using the controller private key stored on the removable data storage device and accessed by the encryption accelerator through the receptacle of the encryption accelerator, to obtain the plaintext controller encryption key, ii) decrypting the encrypted key encryption key, using the plaintext controller encryption key, to obtain the plaintext key encryption key, iii) decrypting the encrypted data encryption key, using the plaintext key encryption key, to obtain the plaintext data encryption key, and iv) decrypting the set of encrypted host data, using the plaintext data encryption key, to obtain a set of plaintext host data, and v) deleting the plaintext controller encryption key, plaintext key encryption key, and plaintext data encryption key from the encryption accelerator.

\* \* \* \* \*